United States Patent
Worthington et al.

(10) Patent No.: US 8,890,814 B2
(45) Date of Patent: Nov. 18, 2014

(54) INPUT DEVICE

(75) Inventors: Samuel Worthington, Preston (GB); David Sharpe, Manchester (GB)

(73) Assignee: Worthington Sharpe Limited, Cheshire (GB)

(*) Notice: Subject to any disclaimer, the term of this patent is extended or adjusted under 35 U.S.C. 154(b) by 175 days.

(21) Appl. No.: 13/521,610

(22) PCT Filed: Jan. 12, 2011

(86) PCT No.: PCT/GB2011/050041
§ 371 (c)(1),
(2), (4) Date: Jul. 11, 2012

(87) PCT Pub. No.: WO2011/086375
PCT Pub. Date: Jul. 21, 2011

(65) Prior Publication Data
US 2012/0299830 A1    Nov. 29, 2012

(30) Foreign Application Priority Data
Jan. 12, 2010 (GB) .................................. 1000445.5

(51) Int. Cl.
G06F 3/033 (2013.01)
G09G 5/08 (2006.01)
G06F 3/0354 (2013.01)
G06F 3/0338 (2013.01)
G05G 9/047 (2006.01)

(52) U.S. Cl.
CPC .......... G06F 3/0338 (2013.01); G06F 3/03543 (2013.01); G05G 9/047 (2013.01)
USPC ........................................ 345/163; 345/158

(58) Field of Classification Search
CPC ............................... G06F 3/033; G06F 3/0346
USPC ................................ 345/156, 161, 163, 167
See application file for complete search history.

(56) References Cited

U.S. PATENT DOCUMENTS 6,064,370 A    5/2000   Wang et al.
6,727,889 B2*  4/2004   Shaw ............................. 345/163
(Continued)

FOREIGN PATENT DOCUMENTS

EP    1343113 A2    9/2003
EP    1411421 A2    4/2004
(Continued)

OTHER PUBLICATIONS

International Search Report and Written Opinion mailed Apr. 19, 2011, in counterpart International Application No. PCT/GB2011/050041 (11pp, in English).

(Continued)

*Primary Examiner* — Ricardo L Osorio
(74) *Attorney, Agent, or Firm* — NSIP Law (57) ABSTRACT

An input device enabling a computer user to provide a range of inputs. The device comprises a body made up of a lower portion and an upper portion; an output interface; and a plurality of movement detectors arranged with the body to detect movements of the input device and based thereon to generate input signals for a computer or other device coupled to the output interface. The movement detectors are arranged to detect rotation about first and second axes defined by rotational movement of the upper portion relative to the lower portion, and movement of a actuatable element carried on one of the lower portion and the upper portion and actuatable independently of the other of the lower portion and the upper portion. The input device further comprises translational movement detectors, enabling a user to further provide three translational inputs.

22 Claims, 6 Drawing Sheets

(56) References Cited

U.S. PATENT DOCUMENTS

| | | | |
|---|---|---|---|
| 7,233,318 B1 * | 6/2007 | Farag et al. | 345/163 |
| 7,345,670 B2 * | 3/2008 | Armstrong | 345/156 |
| 8,004,492 B2 * | 8/2011 | Kramer et al. | 345/156 |
| 2003/0058219 A1 | 3/2003 | Shaw | |
| 2006/0176275 A1 | 8/2006 | Delattre | |
| 2007/0279380 A1 | 12/2007 | Murillo | |
| 2009/0009474 A1 | 1/2009 | Delattre | |

FOREIGN PATENT DOCUMENTS

| | | |
|---|---|---|
| GB | 2283080 A | 4/1995 |
| WO | WO-92/08208 A1 | 5/1992 |

OTHER PUBLICATIONS

UK Search Report dated Nov. 22, 2010, in counterpart UK Patent Application No. GB1000445.5 (5pp, in English).

* cited by examiner

INPUT DEVICE

CROSS-REFERENCE TO RELATED APPLICATIONS

This application is a National Stage of International Application No. PCT/GB11/50041, filed Jan. 12, 2011 and published as WO2011/086375 on Jul. 21, 2011, which claims the benefit of UK Patent Application No. 1000445.5, filed on Jan. 12, 2010, the entire disclosures of which are incorporated herein by reference for all purposes.

FIELD OF THE INVENTION

The present invention relates to input devices, in particular but not exclusively to input devices for use with computer apparatus.

BACKGROUND TO THE INVENTION

A mouse is a known input device for use with computer apparatus. The mouse detects translational movement across a surface and generates signals that control a pointer on a computer display. By moving the mouse and thereby producing a corresponding movement of the pointer a user provides input information for the computer. Mouse technology has developed to allow a user to provide additional input information for the computer by using buttons or a scroll wheel on the mouse.

Problems arise in developing mouse technology to allow a user to provide multiple inputs in addition to the two dimensional movement of a pointer based on the detected movement across a surface. It is an aim of example embodiments of the present invention to address at least one disadvantage of the prior art, whether identified herein, or otherwise.

SUMMARY OF THE INVENTION

In a first aspect, the present invention provides an input device comprising a body made up of a lower portion and an upper portion; an output interface; and a plurality of movement detectors arranged with the body to detect movements of the input device and based thereon to generate input signals for a device coupleable to the output interface, wherein: the movement detectors are arranged to detect rotation about a first axis and a second axis, the first and second axes defined by rotational movement of the upper portion relative to the lower portion, and further arranged to detect movement of an actuatable element carried on one of the lower portion and the upper portion and moveable independently of the other of the lower portion and the upper portion, and wherein the plurality of movement detectors further comprises a movement detector arranged to detect movement of the lower portion across a surface.

Suitably, the actuatable element is associated with a movement detector arranged to detect movement of the actuatable element relative to the one of the lower portion and the upper portion of the body and based thereon to generate input signals for a device coupleable to the output interface, wherein the actuatable element is accessible from at least two sides of the body.

Suitably, the actuatable element is accessible for actuation at opposite sides of the body. Suitably, the actuatable element is accessible for actuation between upper and lower portions of the body. Suitably, the actuatable element is accessible for actuation through openings on two sides of the body.

Suitably, the actuatable element is a rotatable element. Suitably, the movement detectors are arranged to detect movement of the actuatable element relative to a third axis. Suitably, the third axis is a rotational axis of the actuatable element. Suitably, the movement detectors are arranged to detect translational movement of the actuatable element. Suitably, the movement detectors are arranged to detect rotation of the actuatable element about two or more axes, for example rotation about a point. Suitably, the movement detectors are arranged within the body.

Suitably, the movement detectors are arranged to detect actuation of the actuatable element. Suitably, the movement detectors are arranged to detect rotation of the rotatable element about the third axis.

Suitably, the plurality of movement detectors comprises a translational movement detector. Suitably the plurality of movement detectors comprises a movement detector arranged to detect movement of the lower portion in two dimensions across a surface. Suitably the plurality of movement detectors comprises a movement detector arranged to detect movement of the lower portion across a surface on which the lower portion is arranged in use to rest. Suitably, the plurality of movement detectors comprises a translational movement detector arranged to detect movement of the upper portion relative to the lower portion. Suitably, the plurality of movement detectors comprises a translational movement detector arranged to detect movement of the upper portion relative to the lower portion in a vertical direction. Suitably, the plurality of movement detectors comprises a translational movement detector arranged to detect movement of the upper portion relative to the lower portion in direction perpendicular to the surface on which the lower portion is arranged in use to rest. Suitably, the plurality of movement detectors comprises translational movement detectors arranged to detect movements in one, two or three directions, preferably translational movements. Suitably, the plurality of movement detectors comprises movement detectors arranged to detect translational movements in three perpendicular directions.

Suitably, the first and second axes are arranged substantially perpendicular to one another. Suitably, the first, second and third axes are arranged mutually perpendicular to each other. Suitably, the actuatable element is mounted for rotation about a substantially vertical axis. Suitably, the movement detectors are arranged to detect rotation about a first axis aligned axially along the length of the body. Suitably, the movement detectors are arranged to detect rotation about a second axis aligned substantially transverse to length of the body. Suitably, the rotatable element is operatively coupled to the upper portion. Suitably, the actuatable element is rotatable independently of the relative rotation position of the upper portion and the lower portion. Suitably, the actuatable element is actuatable independently of the translational position of the upper portion relative to the lower portion. Suitably, the actuatable element is rotatable independently of the translational position of the upper portion relative to the lower portion. Suitably, the actuatable element is actuatable independently of movement of the lower portion across a surface on which the lower portion is arranged in use to rest. Suitably, the actuatable element is rotatable independently of movement of the lower portion across a surface on which the lower portion is arranged in use to rest.

Suitably, the actuatable element is accessible for actuation through openings on two sides of the body, preferably two opposite sides of the body. Suitably, the openings are defined in the upper portion. Suitably, actuation of the actuatable element in a first rotational direction at a first opening produces a corresponding movement of the rotatable element in the same rotational sense at a second opening. Suitably, the actuatable element is actuatable to rotate in a first rotational direction at a first opening and in a second rotational direction of opposite sense to the first rotational direction at a second opening.

Suitably, one or more of the movement detectors is an analogue detector. Suitably, one or more of the movement detectors is a digital detector.

Suitably, the input device further comprises biasing means which are arranged to bias the upper and lower portions toward a rest position. Suitably, the biasing means comprise a translational biasing element arranged to bias the upper portion away from the lower portion in the rest position. Suitably, the biasing means comprise a first rotational biasing element arranged to bias the upper and lower portions relative to the first axis and toward a rest position. Suitably, the biasing means comprise a second rotational biasing element arranged to bias the upper and lower portions relative to the second axis and toward a rest position. Suitably, the rest position is a central position relative to a range of detection angles for the rotational position the upper portion relative to the lower portion about the first and/or second axes.

According to the present invention there is provided an apparatus and method as set forth in the appended claims. Other features of the invention will be apparent from the dependent claims, and the description which follows.

BRIEF INTRODUCTION TO THE FIGURES

For a better understanding of the invention, and to show how embodiments of the same may be carried into effect, reference will now be made, by way of example, to the accompanying diagrammatic drawings in which.

DESCRIPTION OF EXAMPLE EMBODIMENTS

FIGS. 1-8 show an input device 1 according to a first example embodiment of the present invention. The input device 1 comprises a body made up of a lower portion 10 and an upper portion 20. An output interface 12 is provided to allow the input device 1 to be coupled to a computer or similar device the like and to provide input signals thereto. The input device 1 comprises a plurality of movement detectors arranged with the body to detect movements of the input device 1 and based thereon to generate input signals for a device coupleable to the output interface 12. The movement detectors are shown in more detail in the sectional views of FIGS. 6-8. The movement detectors are arranged to detect rotation about a first, a second and a third axis. The first and second axes are axes of rotational movement of the upper portion 20 relative to the lower portion 10. The third axis is an axis of rotation of an actuatable element 30 carried on the upper portion 20. The actuatable element 30 is rotatable independently of the lower portion and independently of the rotation position of the upper portion relative to the lower portion. Furthermore, the actuatable element 30 is accessible for actuation through openings 32 on two sides of the body, in this embodiment being accessible for actuation with both the thumb and ring finger of a user. The actuatable element 30 is suitably a rotatable element.

Figure 1:
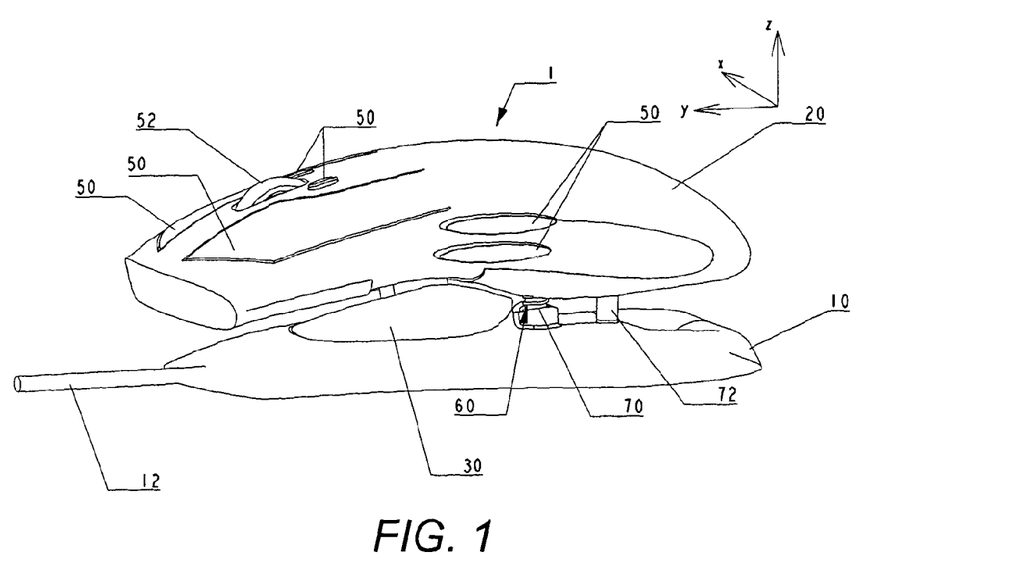
FIG. 1 shows a perspective view of an input device according to a first example embodiment of the present invention.
Figure 2:
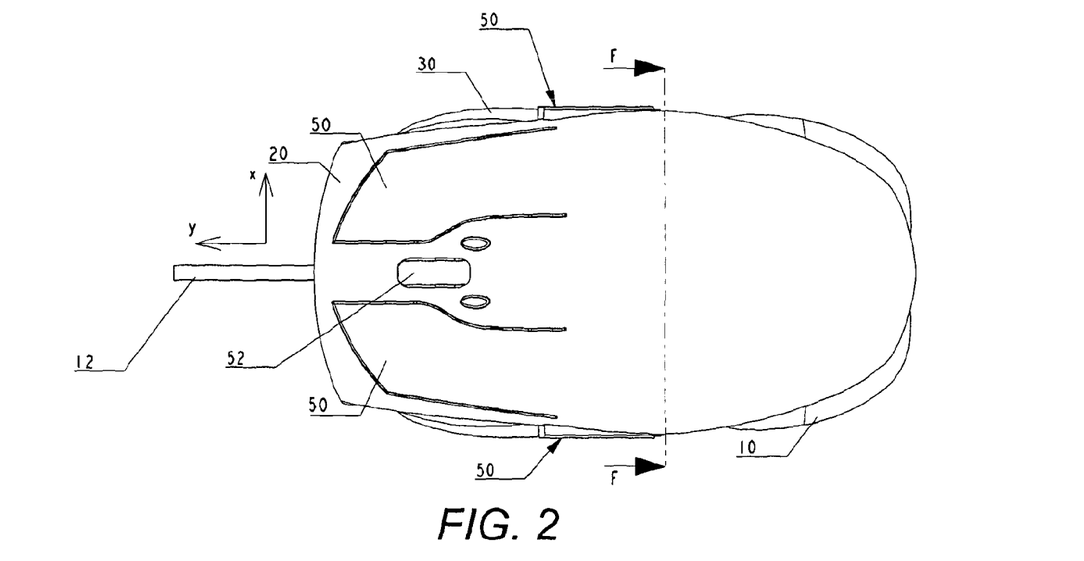
FIG. 2 shows a plan view of the input device of FIG. 1.
Figure 3:
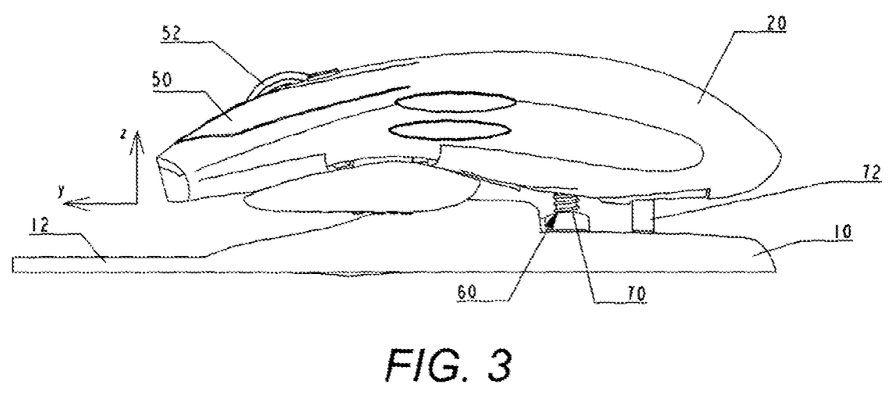
FIG. 3 shows a side view of the input device of FIG. 1.
Figure 4:
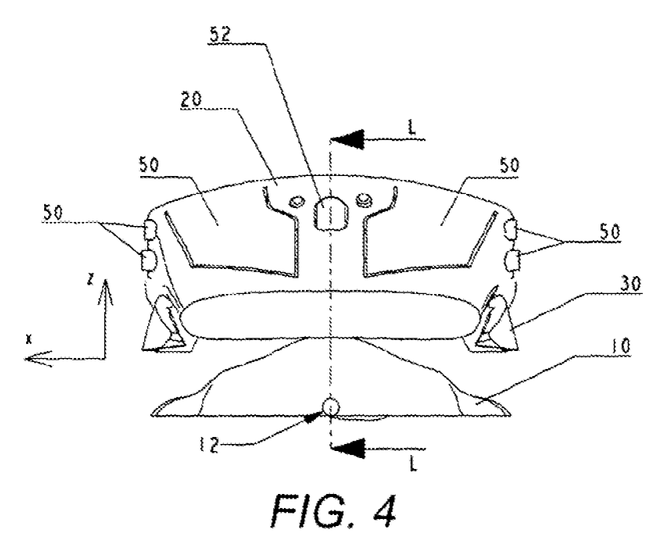
FIG. 4 shows a front view of the input device of FIG. 1.
Figure 5:
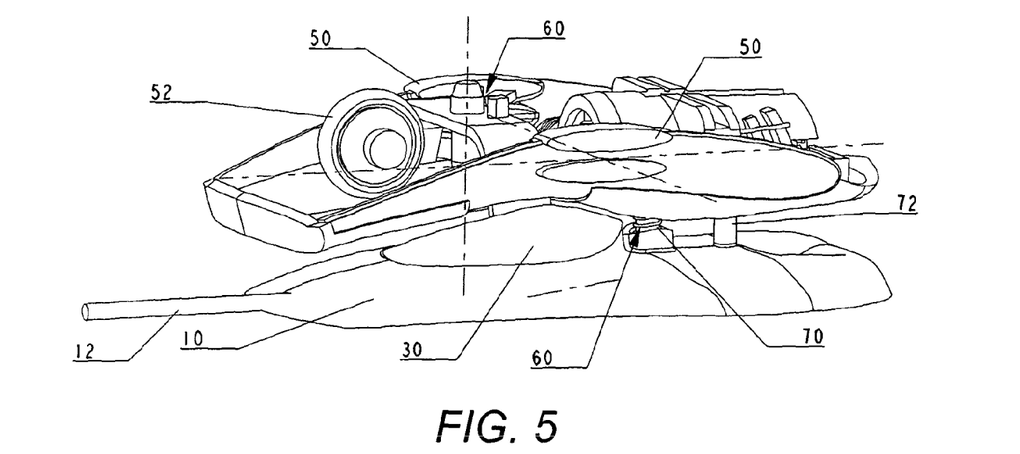
FIG. 5 shows a perspective view of the input device of FIG. 1 with a cover portion removed.
Figure 6:
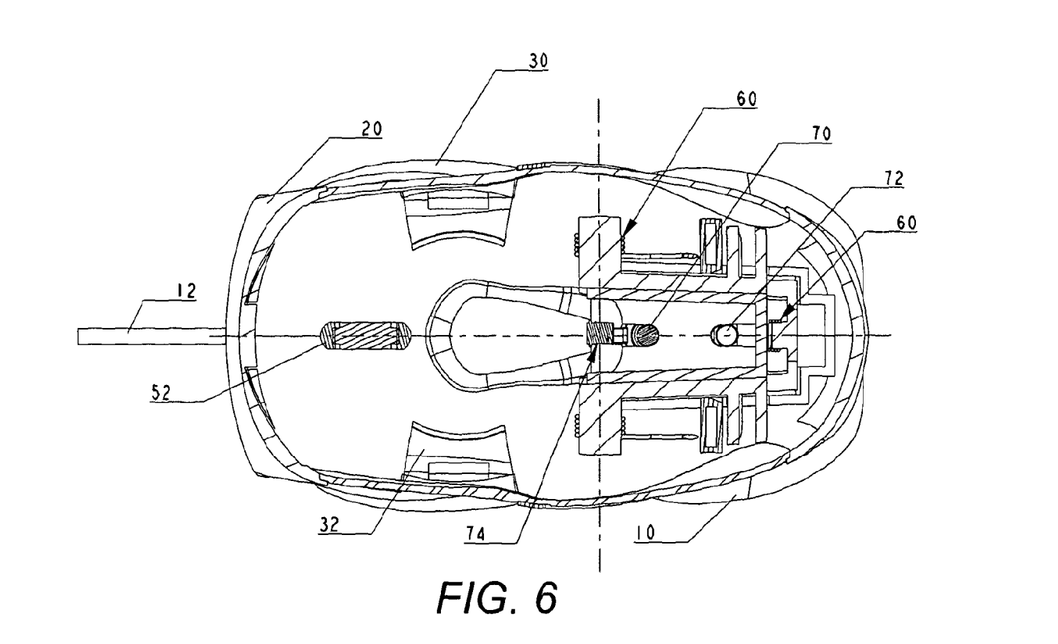
FIGS. 6-8 show sectional views of the input device of FIG. 1.
Figure 7:
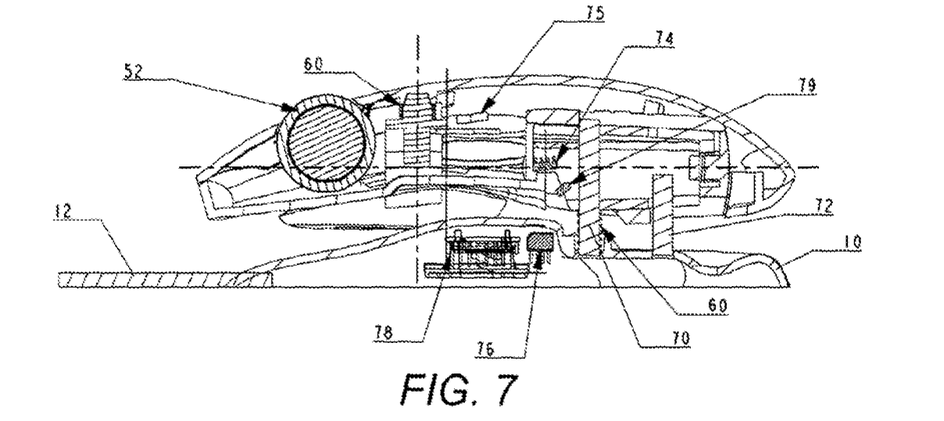
Figure 8:
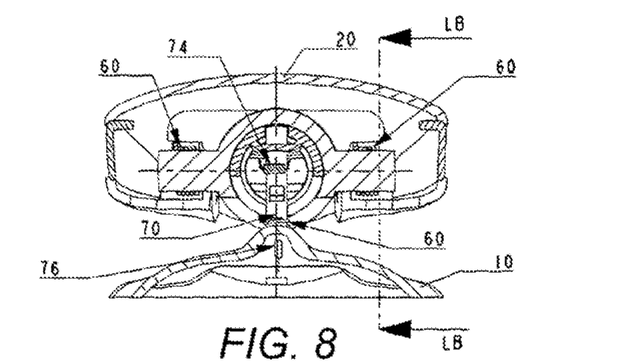

Rotational movement of the upper portion 20 relative to the lower portion 10 about first and second axis is easily achieved by a user, since the user can rest a hand on the input device 1 with the user's natural finger, hand, arm and wrist articulation providing suitable degrees of freedom. However, by separating the third axis as described it becomes convenient to actuate the rotatable element by employing the user's natural finger and thumb articulation. Furthermore, when the input device 1 further comprises translational movement detectors the provision of the actuatable element on one or other of the upper portion and lower portion 10 facilitates independent control of the translational and rotational inputs.

The plurality of movement detectors further comprises a plurality of translational movement detectors including a first movement detector arranged to detect two dimensional movement of the lower portion 10 across a surface. The first movement detector may comprise an electromechanical sensor including a ball arranged to roll over the surface, or an optoelectronic sensor arranged to periodically photograph the surface. In the embodiment shown, the first movement detector 78 comprises a laser-based sensor. In other embodiments a position sensor within the body may be used to detect position information; and by implication movement, for example relative to an external position referencing device or system. The plurality of movement detectors further comprises a second translational movement detector arranged to detect movement of the upper portion 20 relative to the lower portion 10. The second translational movement detector is arranged to detect movement of the upper portion 20 relative to the lower portion 10 in direction perpendicular to the surface on which the lower portion 10 is arranged in use to rest, i.e. in a substantially vertical direction. The second translational movement detector may comprise an electromechanical, optical or electromagnetic sensor. In this way translational movement detectors are able to detect translational movements in three dimensions. In the embodiment shown, the second movement detector comprises a Hall Effect sensor 76 that works with a magnet 79.

The first and second axes are arranged substantially perpendicular to one another and perpendicular to the third axis. The first axis is aligned axially along the length of the body of the input device 1, the second axis is aligned transverse to length of the body and the third axis is a vertical axis. In this way the first and second axis are generally parallel to the plane of the lower portion and the surface on which the input device 1 rests in use.

The actuatable element 30 is accessible for actuation through openings 32 as described above. The openings 32 are provided on opposite sides of the body, both in the upper portion 20. Rotation of the actuatable element 30 in a first rotational direction at a first one of the openings 32 produces a corresponding rotation of the actuatable element 30 at the second one of the openings 32. Rotation of the rotatable element 30 in a second actuatable direction at a first one of the openings 32 produces a corresponding rotation of the rotatable element 30 at the second one of the openings 32. A user can easily rotate the actuatable element 30 in the first direction, e.g. by pulling on the rotatable element with a finger and can easily rotate the rotatable back in the second direction by e.g. pulling on the actuatable element with a thumb. Furthermore, the user can grasp the rotatable element 30 between finger and thumb to impart rotational movement on the rotatable element in either first or second direction.

Figure 10:
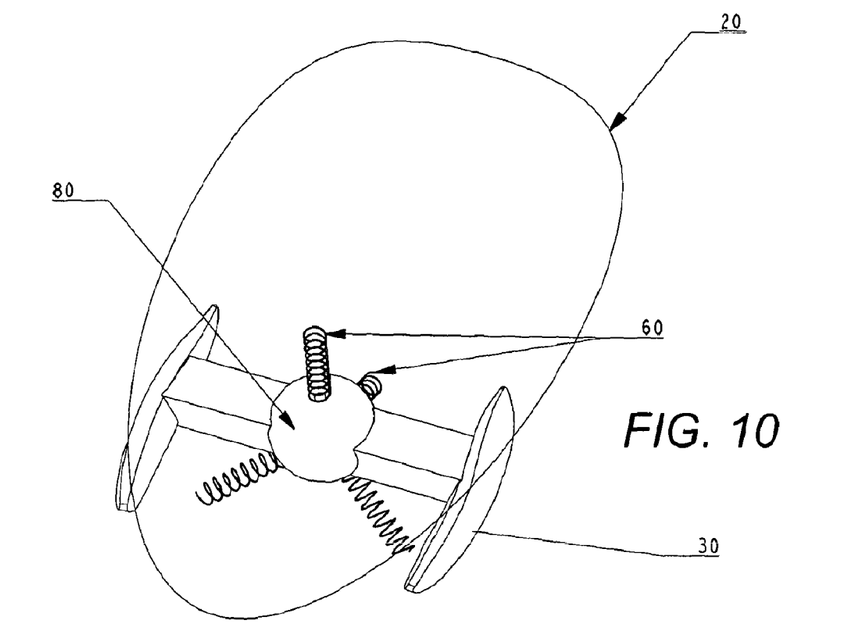
FIGS. 10 and 11 show a perspective views of components for use in further example embodiments of the present invention.
Figure 11:
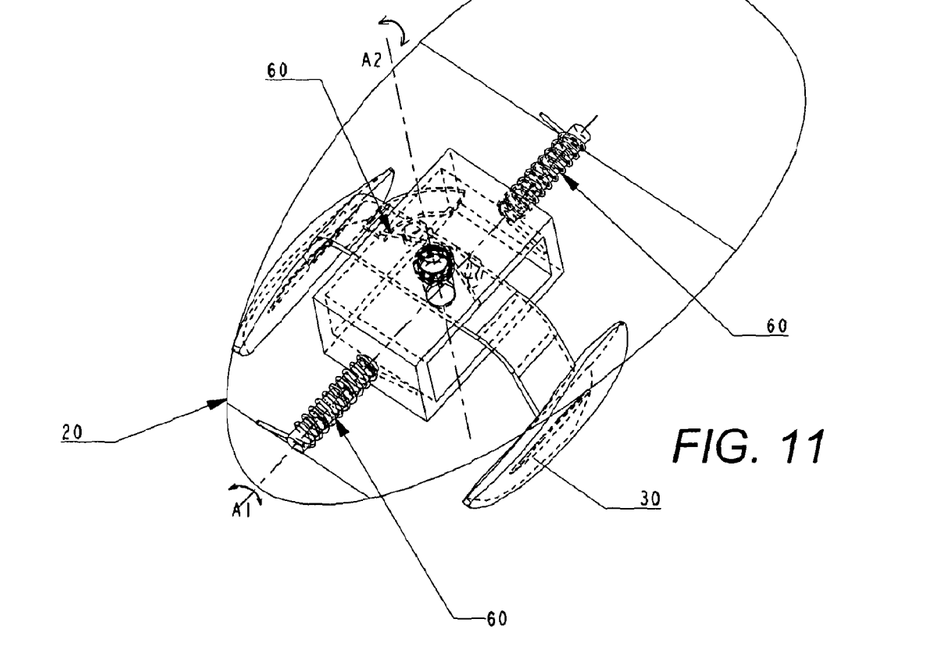

In other embodiments, the actuatable element 30 may suitably be mounted for rotation about two axes, or about a point so as to give a degree of possible rotation about three axes. FIG. 10 shows an actuatable element that may be mounted for rotation about a point at the centre of a suspension arrangement such as that including a spring mounting portion 80. The suspension arrangement shown allows a range of independent rotations to be applied about three perpendicular axes, while at the same time also allowing translation of the actuatable element in up to three perpendicular linear directions in response to suitable actuation provided by a user. The actuatable element 30 is supported on springs 60 to bias the actuatable element 60 toward a rest position. FIG. 11 shows a further embodiment in which the actuatable element 30 is rotatable about two axes A1, A2, and further arranged to translate backwards and forwards in a direction parallel to the axis A1. Again, biasing springs 60 are provided to support the actuatable element 30 and to urge it towards a rest position.

Movement detectors for detecting movement of the actuatable element 30 relative to the upper portion 20 are provided, as are movement detectors for detecting rotational movement between the upper portion 20 and the lower portion 10. Each movement detector is an analogue detector though other embodiments may use digital detectors. As described above the movement detectors may comprise electromechanical, optical, electromagnetic or other sensors, with electromagnetic sensors employing the Hall Effect suitable for detecting relative linear movement between the upper and lower portions 20,10, and are further suitable for detecting relative rotation between the upper and lower portions 20,10. In the embodiment shown, movement of the actuatable element 30 is detected by an optical sensor 75. Rotational movements of pitch and roll between the upper and lower portions 20,10 are detected by a Hall effect sensor 74 that works with the magnet 79 described above. Hall Effect sensors working with a common magnet and also optical sensors are preferred, as these sensor arrangements to reduce the risk of magnetic interference from multiple moving magnets, or other cross-talk between sensors leading to erroneous movement detections. In addition, the input device may further comprise a plurality of buttons 50 and a scroll wheel 52 coupled to the output interface 12 and actuatable by a user.

The input device 1 comprises biasing means arranged which are arranged to bias the upper and lower portions 20,10 toward a rest position in which the upper portion 20 is pushed away from the lower portion 10, and in which the upper portion 20 is centrally arranged relative to its range of rotation about the first and second axes. The Figures show the input device 1 in the rest position. The rest position is also a central position relative to a range of detection angles for the rotational position the upper portion relative to the lower portion about the first and second axes. Springs 60 as shown in the Figures provide suitable biasing characteristics. The biasing force provided by the biasing means in relation to the range of rotation of the upper portion about the first and second axes is selected to be greater than the force required to actuate any one of the buttons 50, when the button actuation force is applied at the user's normal hand position when operating the buttons. Typically the button actuation force is in the region of 0.8 Newtons for the main left and right buttons which are present on the top surface of the upper portion 20 and 1.6 Newtons for the scroll wheel 52. These forces would be applied on a button 50, typically at a distance of 60 millimeters from the centre of rotation, whereas the torque required to produce movement against the biasing means is in the region of 100 Newton millimeters. If a button with a different actuation force is used, or the distance between the typical button actuation position is changed, then the spring torque would be altered accordingly. In other embodiments force-feedback can be used where software controlled motors define the rest position. In this case the rest position need not be central and the resistive force could be altered by the user or as programmed by the computer software.

In the same way the pre-tension spring force of the z-translation spring is specified to resist the typical vertical load from the users hand resting on the upper portion and resulting from the general x-y translation, and operation of the pitching and rolling functions.

More detail on the connection between upper and lower portions 20,10 follows, described in terms of x and y horizontal translation axes and a vertical z axis of translation, and in terms of pitch and roll axes that relate to rotation about axes parallel to the x and y axes respectively.

The upper portion 20 houses the majority of the mechanism that enables articulation between upper and lower portions 20,10. A z-translational member is arranged to move parallel to the z axis by sliding up and down a shaft 70 connected to the lower portion 10. The z-translational member is prevented from rotating relative to the lower portion 10 about the z axis by sliders that move against a second shaft 72 fixed to the lower portion 10. Preventing relative rotation about the shaft 70 in an alternative embodiment may be achieved using a single non-round shaft engaging a corresponding slot.

A roll member is mounted on the z-translational member and is free to roll about the z-translational member. A pitch member is fixed to or is part of the upper portion 20 and is free to rotate in pitch about the roll member.

Biasing springs, or in other embodiments alternative centring arrangements work with this mechanism and with mechanical stops to limits movement within a predetermined range. The mounting of the members of the mechanism that enable articulation of the upper portion relative to the lower portion could in alternative embodiments be re-arranged, for example a pitch member could rotate about the z-translational member with a roll member fixed to the upper portion.

Biasing springs for pitch, roll and yaw are arranged so they are fitted to the lower portion 10 with the legs pressing against limit stops. This means when the upper portion 20 presses against one of the legs moving it further the spring is already under compression and a definite movement centre can be felt.

Figure 9:
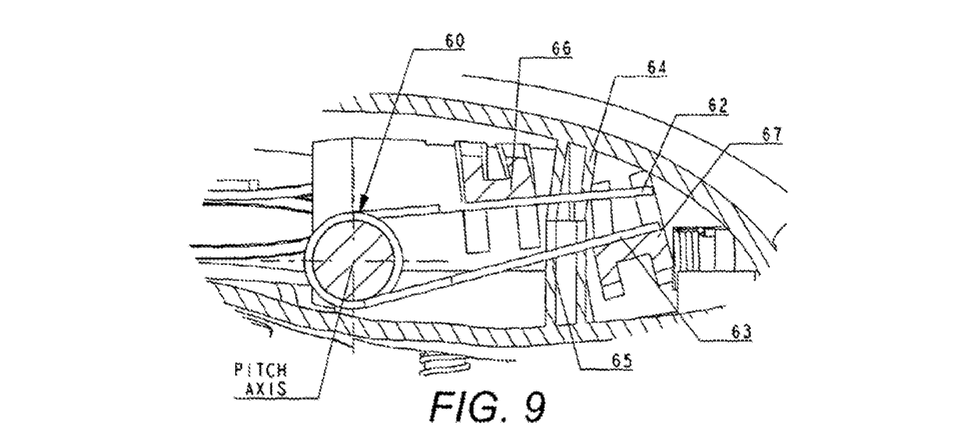
FIG. 9 shows a sectional view of a biasing means within the input device of FIG. 1.

FIG. 9 shows an example bias spring arrangement in more detail. FIG. 9 shows a bias spring 60 which urges the pitch member toward a neutral position relative to the roll member. The bias spring arrangement comprises a spring legs 62, 63 arranged to act against pre-load stops 64,65 and active-load stops 66,67. The pre-load stops 64,65 ensure that a degree of compression is applied to the spring 60 when no external force is applied to the input device. Rotation of the pitch member in a clockwise direction about the pitch axis causes the active-load stop 66 of the pitch member to act against the bias of the spring 60 by engaging the spring leg 62 and moving to further compress the spring 60, which is supported at the other spring leg 63 against the pre-load and the active-load stops 65,67. Conversely rotation of the pitch member in an anti-clockwise direction about the pitch axis causes the active-load stop 67 to act against the bias of the spring 60 by engaging the spring leg 63 and moving to further compress the spring 60, which is supported at the other spring leg 62 against the pre-load and active-load stops 64,66. Similar arrangements with a movement centre are provided for the other relative movements between components of the input device.

The example embodiment described above comprising Hall effect movement detectors may conveniently be constructed with a combined pitch/roll Hall effect sensor mounted at the centre of rotation for pitch and roll. A z-translational Hall effect sensor is conveniently mounted in the lower portion 10. With this configuration a single magnet mounted in the upper portion 20, e.g. on the z-translational member can conveniently be used for both Hall effect sensors.

The clearance between openings in the upper and lower portions 20, 10 is largely constant, for example less than 1 mm. This is prevents excessive gaps, thereby protecting the internal workings of the input device from foreign objects. Alternatively, or in addition protection for the internal workings can be provided by using a flexible membrane covering any openings between moving parts.

Figure 12:
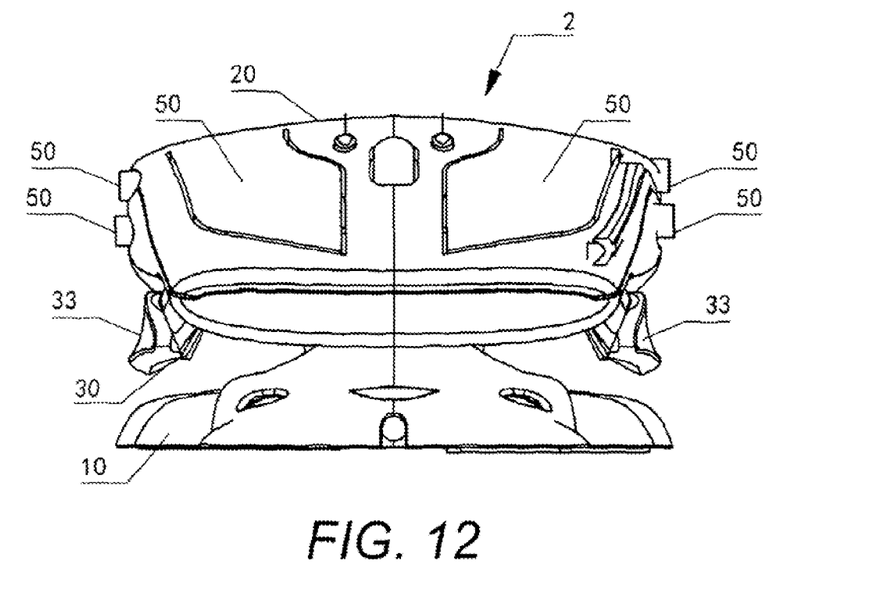
FIGS. 12 and 13 respectively show front and back views of an input device according to a further example embodiment of the present invention.
Figure 13:
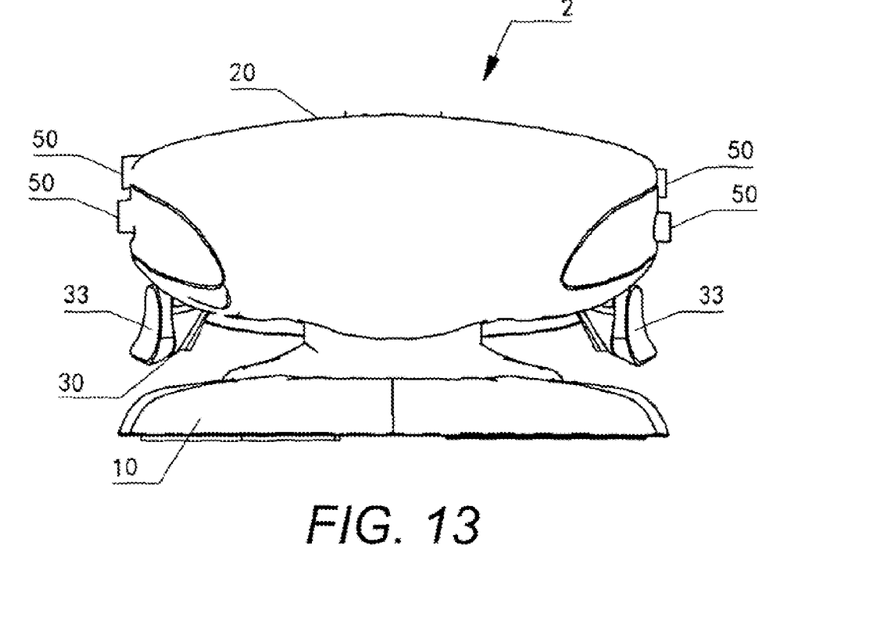

FIGS. 12 and 13 show a further example embodiment of input device 2 in which the actuatable element 30 is provided with grip portions 33. The grip portions are provided to facilitate manipulation of the actuatable element 30 by a user. The grip portions 33 present at least in part a surface which is angled generally upwards and against which an inward grip enables a downward force to be easily applied. The grip portions 33 present at least in part a surface which is angled generally downwards and against which an inward grip enables an upward force to be easily applied. The grip portions 33 suitably provide a concave surface to be pressed against by the user when either rotating the actuatable element 30, or when moving the upper portion 20. The grip portions 33 are arranged to facilitate grasping, and with the actuatable element 30 mounted as described enable a user to grasp the actuatable element 30 to thereby pick up or slide the input device across a surface, and to control movement of the upper portion 20 relative to the lower portion 10 in roll and pitch rotation and in z-translation. In addition, the transfer of forces to the upper portion 20 is facilitated by the grip portions 33 such that any incidental loads produced on the upper portion 20 in the region of the buttons 50 and a scroll wheel 52 do not lead to unintended inputs in the form of button presses or scroll wheel rotation. The grip portions may include high friction materials, and/or textured surfaces to further enhance grip, for example a rubbery material formed into bumps or ribs. In other embodiments (not shown), grip portions as described may also or alternatively be provided on the upper portion 20.

The input devices described herein conveniently allow a user to generate inputs corresponding to three orthogonal rotational inputs and three orthogonal translational inputs, or other combinations of inputs. The inputs are provided in a manner which intuitive to users familiar with the operation of a standard computer mouse. The benefit of sliding the input device over a surface to produce translational input signals, and the ability of the user to pick up and move the input device to different start positions for sliding or to enable convenient repetition of a particular sliding input are retained. The inputs are conveniently generated using only a single hand of the user leaving the fingers free to independently operate buttons or other functions on the device.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. An input device, comprising:
   a body made up of a lower portion and an upper portion;
   an output interface; and
   a plurality of movement detectors arranged with the body to detect movements of the input device and based thereon to generate input signals for a device coupleable to the output interface,
   wherein the movement detectors are arranged to detect rotation about a first axis and a second axis, the first and second axes defined by rotational movement of the upper portion relative to the lower portion, and further arranged to detect movement of an actuatable element carried on one of the lower portion and the upper portion and moveable independently of the other of the lower portion and the upper portion,
   wherein the plurality of movement detectors further comprises a movement detector arranged to detect movement of the lower portion across a surface, and
   wherein the input device further comprises biasing means which are arranged to bias the upper and lower portions toward a rest position, wherein the biasing means comprises a biasing arrangement which acts against pre-load stops and active-load stops such that the pre-load stops apply a degree of bias when no external force is applied to the input device so that a definite movement centre can be felt.

2. The input device of claim 1, wherein the actuatable element is associated with a movement detector arranged to detect movement of the actuatable element relative to the one of the lower portion and the upper portion of the body and based thereon to generate input signals for a device coupleable to the output interface, wherein the actuatable element is accessible from at least two sides of the body.

3. The input device of claim 1, wherein the actuatable element is accessible for actuation at opposite sides of the body.

4. The input device of claim 1, wherein the actuatable element is accessible for actuation between upper and lower portions of the body.

5. The input device of claim 1, wherein the actuatable element is a rotatable element.

6. The input device of claim 1, wherein the movement detectors are arranged to detect movement of the actuatable element relative to a third axis being a rotational axis of the actuatable element.

7. The input device of claim 1, wherein the movement detectors are arranged to detect rotation of the actuatable element about two or more axes, corresponding to rotation about a point.

8. The input device of claim 1, wherein the plurality of movement detectors comprises at least one of: a movement detector arranged to detect movement of the lower portion across a surface on which the lower portion is arranged in use to rest, a translational movement detector arranged to detect movement of the upper portion relative to the lower portion; a translational movement detector arranged to detect movement of the upper portion relative to the lower portion in a vertical direction; and a translational movement detector arranged to detect movement of the upper portion relative to the lower portion in direction perpendicular to the surface, on which the lower portion is arranged in use to rest.

9. The input device of claim 1, wherein the plurality of movement detectors comprises movement detectors arranged to detect translational movements in one, two, or three perpendicular directions.

10. The input device of claim 1, wherein at least two of the first axis, the second axis, and a third axis are arranged mutually perpendicular to each other.

11. The input device of claim 1, wherein the actuatable element is mounted for rotation about a substantially vertical axis.

12. The input device of claim 1, wherein the movement detectors are arranged to detect rotation about a first axis aligned axially along the length of the body, and wherein the movement detectors are arranged to detect rotation about a second axis aligned substantially transverse to length of the body.

13. The input device of claim 1, wherein the actuatable element is operatively coupled to the upper portion.

14. The input device of claim 1, wherein the actuatable element is accessible for actuation through openings on two sides of the body, preferably two opposite sides of the body and the openings are defined in the upper portion.

15. The input device of claim 1, wherein actuation of the actuatable element in a first rotational direction at a first opening produces a corresponding movement of the rotatable element in the same rotational sense at a second opening.

16. The input device of claim 1, comprising grip portions to facilitate manipulation of the actuatable element by a user, wherein the grip portions present at least in part a surface which is angled generally upwards and against which a gentle inward grip enables a downward force to be easily applied.

17. The input device of claim 1, wherein the biasing means comprise at least one of: a translational biasing element arranged to bias the upper portion away from the lower portion in the rest position; a first rotational biasing element arranged to bias the upper and lower portions relative to the first axis and toward a rest position; and a second rotational biasing element arranged to bias the upper and lower portions relative to the second axis and toward a rest position.

18. The input device of claim 1, wherein the rest position is a central position relative to a range of detection angles for the rotational position the upper portion relative to the lower portion about the first and/or second axes.

19. The input device of claim 1, wherein the biasing means comprises bias springs, for at least one of pitch, roll and yaw, or translation of the upper portion relative to the lower portion, fitted to the lower portion with the legs pressing against limit stops such that when the upper portion presses against one of the legs moving it further, the spring is already under compression, and a definite movement centre can be felt.

20. The input device of claim 1, wherein rotation of a pitch member in a clockwise direction about a pitch axis causes an active-load stop of the pitch member to act against the bias of a spring by engaging the spring leg, and moving to further compress the spring causes the spring to be supported at its other spring leg against pre-load and active-load stops.

21. The input device of claim 20, wherein rotation of the pitch member in an anti-clockwise direction about the pitch axis causes the active-load stop to act against the bias of the spring by engaging a spring leg and moving to further compress the spring causes the spring to be supported at its other spring leg against the pre-load and active-load stops.

22. The input device of claim 21, wherein the biasing force provided by the biasing means in relation to the range of rotation of the upper portion about the first and second axes is selected to be greater than the force required to actuate the any one of the at least one button when a button actuation force is applied at the user's normal hand position when operating the buttons.

* * * * *